United States Patent [19]

Hochman

[11] Patent Number: 4,503,880

[45] Date of Patent: Mar. 12, 1985

[54] FLUID DISTRIBUTION LOCKOUT APPARATUS

[75] Inventor: Sherman W. Hochman, Whitefish Bay, Wis.

[73] Assignee: Wisconsin Gas Company, Milwaukee, Wis.

[21] Appl. No.: 395,857

[22] Filed: Jul. 6, 1982

[51] Int. Cl.³ .............................................. F16K 35/00
[52] U.S. Cl. .................................. 137/377; 137/384; 137/315; 138/89; 411/911
[58] Field of Search ................ 137/384, 383, 377, 15, 137/315; 138/89, 97; 220/86 AT, 234, 235; 411/911; 73/201

[56] References Cited

U.S. PATENT DOCUMENTS

| 2,155,491 | 4/1939 | Jacobs | 138/89 |
| 2,620,822 | 12/1952 | Peterson et al. | 137/383 |
| 2,659,952 | 11/1953 | Schlueter | 411/911 |
| 2,993,616 | 7/1961 | Carlile, Jr. et al. | 220/235 |
| 3,615,159 | 10/1971 | Munoz | 137/15 |
| 3,946,754 | 3/1976 | Cook | 137/315 |

Primary Examiner—A. Michael Chambers
Assistant Examiner—Sheri Novack
Attorney, Agent, or Firm—Andrus, Sceales, Starke & Sawall

[57] ABSTRACT

A lockout device for a consumer gas supply includes a swivel pipe having an intermediate angulated section having a swivel connector at one end and a threaded connection at the opposite end. The swivel pipe is connected to the gas meter. An expandable plug unit includes a rubber plug with hardened washers abutting the opposite ends. A nut is fixedly attached to one washer and an expanding bolt of a hardened metal extends through washers and plugs with a threaded connection to the nut. The head has a screw driver slot which permits rotating the bolt only to expand the plug. The washers and bolt are formed of a case hardened steel so as to require special shop drill to destroy plug unit for removal and reopening the swivel pipe.

8 Claims, 4 Drawing Figures

FLUID DISTRIBUTION LOCKOUT APPARATUS

BACKGROUND OF THE INVENTION

This invention relates to a fluid distribution cut-off apparatus and particularly to such apparatus for operatively disconnecting a utility distribution line from the consumer.

In the distribution of natural gas, water and the like, public or privately owned utilities provide a distribution system from a central source or supply to the several consumers. The distribution system includes main distribution lines, usually buried in the street or along the lot lines, and connected to each of the individual consumers by an individual connecting lateral line. A metering unit is universally connected to the individual's lateral line, immediately at the building connection. A cut-off valve is conventionally provided adjacent the meter connections. This permits closing and shut-off of the supply from the distribution system to the consumer for service and the like. Although the present invention can be applied to any kind of utility distribution system or the like, it has been developed in connection with, and is therefore described in connection with a natural gas distribution system.

The shut-off valve structures are generally provided with a locking unit which permits the utility to lock the valve in the closed position. Thus, if the consumer terminates service or fails to make proper payments for gas usage, the utility may lock the valve in the closed position until new service is again demanded or proper payment has been made.

However, significant problems have been encountered with the delinquent paying consumers who break a locked valve and open the valve with continued but unauthorized consumption of gas. The economic loss associated with such unauthorized usage is significant. The loss is particularly significant during economic recessions and the like when it may be practically impossible to recover from such unauthorized users.

In addition to a lock device, it has been suggested at least in publication if not in commercial practice, that certain internal mechanisms requiring special tooling be used to provide a cut-off of the gas supply. For example, the old U.S. Pat. No. 1,850,040 (which issued Mar. 15, 1932) discloses an internal cut-off device for preventing the theft of gas. In that device, the utility would insert an expandible plug into the T-connection of the consumer's supply pipe within the consumer house or other building structure. An expandable plug is specially constructed to be inserted within the stem portion of the T-shaped connection. A threaded actuating rod extends through the plug and a threaded washer on the inner face into abutment with the cross-piping of the T-shaped coupler. Turning of the threaded rod in one direction expands the plug member to fill the pipe and thereby seal off the connection. A reverse threading or rotation of the threaded rod results in a collapse of the plug to permit ready removal. In order to prevent unauthorized tampering and release of the plug, a special tool is provided. In particular, the operating end of the rod is specially constructed to require insertion of a special coupling tool. Such suggestion, however, assumes that the consumer will not be able to circumvent such internal specially constructed apparatus. Thus, generally a utility will not want to have a great number of different actuators and will settle on a single standardize construction. This makes it rather readily convenient for the unauthorized users to obtain a special coupling device, particularly a large volume consumer. In summary, such systems do not anticipate the resourcefulness of the consumer in providing the necessary tooling for a standardized cut-off apparatus or system.

Recognizing that it is probably practically impossible to devise any cut-off device which can be replaced or released by the utility which cannot also be circumvented, there is therefore still a significant demand and need for a simple reliable cut-off device which can minimize the probability of circumvention by the cut-off consumer. The prior art devices have not provided a particularly satisfactory solution.

SUMMARY OF THE PRESENT INVENTION

The present invention is particularly directed to an improved unique cut-off apparatus constructed and arranged to significantly minimize the probability of circumvention, and increasing significantly the difficulty in releasing of the cut-off apparatus. Generally in accordance with the present invention, a cut-off apparatus includes an expandable plug device of a construction which permits only expansion to a cut-off state or condition and requires subsequent destruction of the device to a reset, open condition. Thus, a preferred embodiment includes an expandable plug, which may be formed of a suitable rubber-like material, with clamping washers to the opposite ends. An expanding bolt extends through the plug and washers. The bolt has an actuation which permits rotation to expand the plug only.

The cut-off device is specially constructed in such a manner as to prevent destruction and thereby removal without use of special equipment. For example, in a particularly practical embodiment the parts forming a part of the expandable plug unit, except for a rubber-like plug, have been formed of a suitable case hardened steel or other like metal to prevent destruction and therefor removal using conventional available tooling at the site of the meter. Thus, the pipe section must be removed and placed in special drill unit to permit destruction of the case hardened metal parts.

Further, the plug device of this invention is selectively introduced into a swivel pipe section of the lateral or controlled piping line system, such as the meter connection pipe which is widely used or provided in gas utility distribution systems. The pipe section is downstream of the cut-off valve and may be removed for insertion of the lockout plug device. This locates the lockout device into a more or less inaccessible location. Once the lockout plug device is installed and closed, the plug-device practically cannot be released to reopen the line. Rather, the special pipe section must be physically removed, thereby permitting access to the lockout device. Further the lockout device must then be destroyed and removed to permit reopening of the gas line. Thus, the unauthorized consumer cannot just merely open a line and release the lockout apparatus but must actually destroy the lockout plug unit or separate and replace the pipe section.

Although the system can of course be circumvented in the same manner used by the utility to reopen the system it is much more difficult to require not only special tooling but the necessary special pipe sections and the like. The utility can readily have the various tools as well as the pipe sections available to permit the convenient and proper replacement.

The present invention thus provides a significant improvement in a lockout apparatus for use by utilities and other supplies of similar fluid distribution systems where it is necessary to introduce essentially tamper proof cut-off or lockout apparatus.

DESCRIPTION OF THE DRAWING FIGURES

The drawing furnished herewith illustrates a preferred construction of the present invention in which the above advantages and features are clearly disclosed as well as others which will be readily understood from the following description.

In the drawing:

FIG. 1 is an elevational fragmentary view of a typical gas distribution system connection to a distribution lateral line to the consumer's pipe system;

FIG. 2 is an enlarged fragmentary view of the swivel pipe section shown in FIG. 1, with parts broken away and sectioned to more clearly illustrate the location and structure of a lockout device; and FIG. 3 is an end view taken generally on line 3—3 of FIG. 2 and more clearly illustrating the operating end of an expanding actuator of the lockout device; and FIG. 4 is an exploded view of the expandable lockout device.

DESCRIPTION OF THE ILLUSTRATED EMBODIMENT

Figure 1:
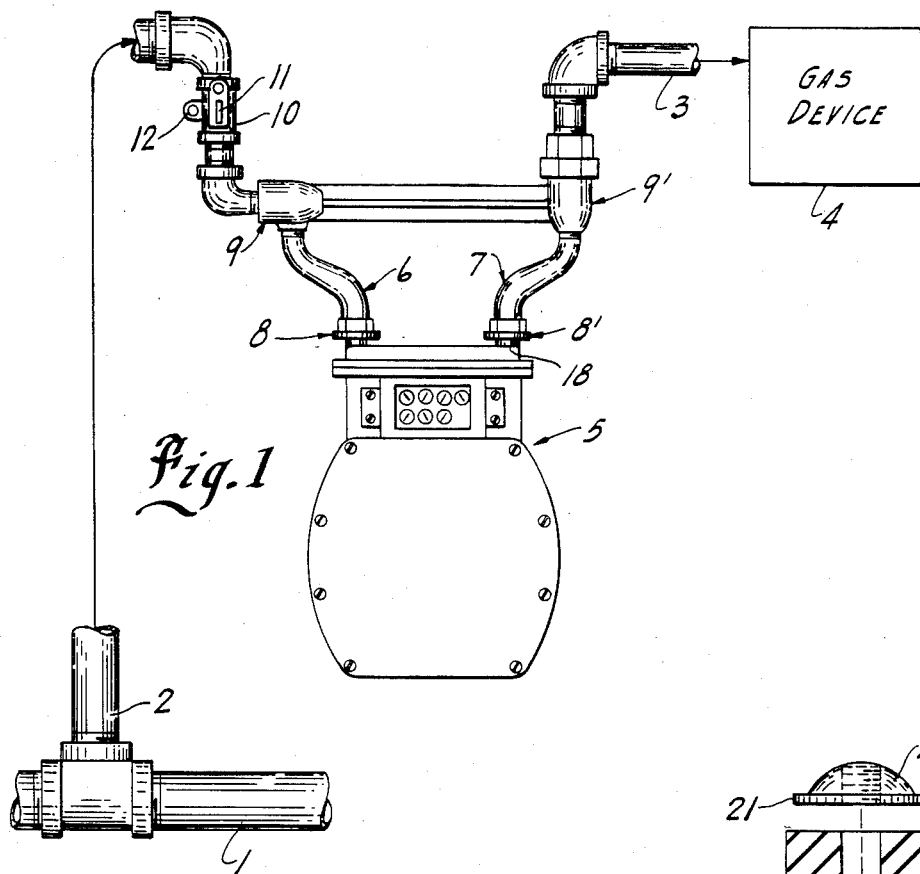

Referring to the drawings and particularly to FIG. 1, a conventional natural gas distribution system is partially illustrated including a main gas line 1 and a lateral line 2 interconnected to a retail consumer's distribution input pipe 3 for distribution to consuming devices 4, such as the furnace, hot water heater, ranges and such other appliances which might be used. The individual appliances may be of any usual variety and are suitably connected in any well known manner to the consumer's distribution pipe system. A gas meter 5 is connected between the individual lateral line 2 and the input pipe 3 of the consumer's distribution pipe system. The gas meter 5 includes a swivel pipe 6 and 7 forming an offset connection to input and output of the meter 1. The input swivel pipe 6 includes a special swivel coupling interconnecting the one end of the swivel pipe 6 to the meter 5. The opposite end of pipe 6 is threaded and threads into the adjacent line pipe connector 9 to fix the connection and complete the in-line connection. The swivel pipe 7 is similarly connected to the output side of meter 5, as shown. The swivel coupling 8 is provided to permit the positioning of the interconnection to the particular structural requirement and to accommodate normal variations in the several piping sections encountered in placement of the gas meter 5. The input pipe connection system may be provided with the conventional valve 10 having a rotating lever 11 opening and closing the connection. The lever 11 is apertured conventionally and when closed is aligned with an apertured fix flange 12. A suitable lock, not shown, can be used to lock valve 10 closed.

Figure 2:
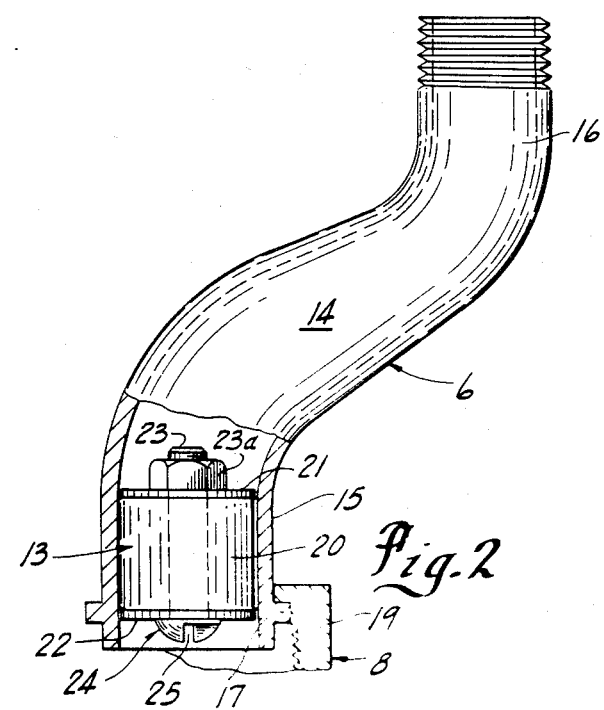

When the consumer supply is to be locked out in accordance with this invention, a lockout plug unit or device 13 is placed within the swivel-coupled end of the swivel pipe, as shown in FIG. 2. As more fully developed hereinafter, the lockout plug device 13 is specially constructed to prevent removal other than by essential destruction of the device 13.

The utility workmen thus disassemble the swivel pipe 6 from the connection. The gas supply system can now only be reconnected by replacement of swivel pipe 6 without the device 13. The lockout apparatus is specially constructed to make such action difficult. The swivel pipe 6 includes a central straight portion 14 integrally connected to angulated end legs 15 and 16 extending from the opposite ends of the control portion to the opposite ends. The one end is threaded and the opposite end 15 is specially formed with a swivel member 17 forming part of the swivel coupling 7.

The angulated swivel pipe construction in essence isolates the short plugged pipe section 15 and prevents the introduction of a tool member through the long end for access to the lockout plug device 13. This thus restricts access to the lockout device 13 to the swivel end or leg 15. As the result, once the lockout device 13 is inserted into the swivel leg end 15, the pipe 6 including the swivel coupling 8 must be disassembled in order to obtain access to the lockout device.

The swivel coupling of course is a special sealed connection and includes a straight pipe member 16 secured to the fixed meter 5 and connected by a flanged coupling nut 19 to the special member 17 of swivel pipe 6.

Further, as presently described, the lockout device 13 is further specially constructed in accordance with an optimum and preferred embodiment of the present invention to require special pipe 6 or special tooling to remove the lockout device 13 which special tooling will not be readily or conveniently available to the unauthorized consumer.

Figure 4:
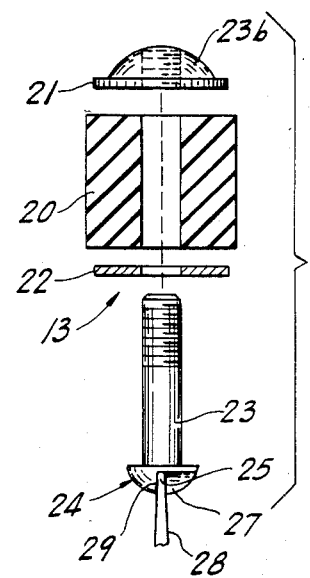
Figure 3:
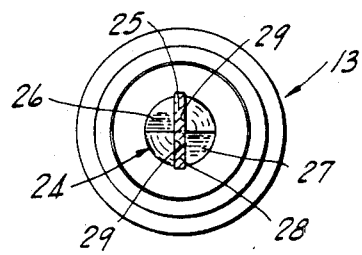

More particularly referring particularly to FIGS. 3–4, the illustrated lockout device 13 is an expandable plug assembly consisting of a cylindrical plug 20 having clamping washers 21 and 22 abutting the opposite end faces. A clamping rod or bolt 23 passes through the washers 21–22 and rubber cylindrical plug 20 and threads into a nut member 23a, as shown in FIG. 3 or specially formed as shown in FIG. 4, which may be affixed to the end washer 21. Rotation of the bolt 23 serves to draw the washers 21–22 together and thereby expands the rubber plug 20 therebetween to enlarge its outer diameter. The washer 21 may be formed with a roughened surface, such that the engagement with the end of plug more firmly prevents rotation of nut 23a with bolt 23. This forms a well known sealing plug means such as previously used in various industrial and consumer applications. In the present invention the bolt 23 includes an operator or head 24 which is specially formed to permit one-way coupling to a tool, and in particular in the illustrated embodiment to a standard screw driver. Thus, the bolt head 24 is shown as a conventional round head with a diametrical screw driver slot 25. Opposite quadrants of the head on the opposite sides of slot 25 are removed and formed with inclined caming surfaces 26 and 27. Thus, with a screw driver 28 inserted into the slot 25 rotation in one direction, shown clockwise in FIG. 4, engages the flat surfaces 29 of the slot 25 to provide the conventional turning of the screw. The structure is of course constructed and arranged such that this operation expands the rubber plug 20.

Rotation of the screw driver 28 in the opposite direction, merely results in the end of the screw driving riding upwardly on the cam surfaces 26–27 and out of the head slot 25.

As shown most clearly in FIG. 2, the lockout device 13 is located in pipe 6 with the head 24 exposed only from swivel end of the swivel pipe 6.

The bolt and particlarly head 24 and at least the outer end washer 22 are case-hardened or otherwise constructed of a suitable steel or other metal or material which for practical purposes prevents the destruction thereof by use of a conventional drilling or grinding tool. Thus, an unauthorized user cannot remove the device 13 by use of conventional manually manipulated drills and the like, but rather require a special jig and tooling.

The special tooling may thus be a special drill fixture to appropriately support the swivel pipe 6 with the lockout unit 13 sealed in place. A suitable high speed drill or the like permits the destruction of the bolt head 24 and/or washer 22. Such special tooling can be readily found in a suitable machine shop but is not readily available to the usual consumer.

In usage when the utility wishes to disconnect a customer, the service man closes valve 10, introduces the lockout plug device 13 and rotates the bolt 23 to firmly and tightly expand the plug 20 in the sealed position. The customer is now locked out. Valve 10 may also be locked.

When service is to be restored the service employee is sent to the installation, removes and replaces the entire swivel pipe 6 with a new pipe section and thereby establishes the gas supply upon opening of valve 10. The plugged swivel pipe 6 is returned to the plant for recycling.

Although shown in the single side of the meter 5, the lockout devices may be simultaneously applied to the opposite side of the meter 5.

The plug-unit is particularly affixed from the head end and the nut member at the inner end may be of any desired shape or configuration. Thus the nut may be as conventional, inexpensive hex nut. In a curved pipe, as shown, the nut is practically inaccessible and thus could not be reached to release the plug. If the invention were applied to a straight swivel pipe section, however, one might circumvent the lock-out. The nut may therefore be specially formed to prevent gripping by a tool and such circumvention. For example, the specially forming of the nut may be on the form of a smooth, round member or even more preferably as a substantially semispherically shaped nut member 23b, such as shown in FIG. 4. Thus, the nut 23b creates a continuously smooth curved surface. This is permissible as the washer 21 does not need to be held to tighten the plug-unit because the engagement of the washer with the plug 20 may readily prevent turning of the nut when tightening of the bolt.

Although shown in a preferred embodiment, any other suitable essentially tamper proof closure device can be used in the piping which is specially constructed to minimize the probability of reopening on site using conventional tooling readily available to the consumer. For example, the pipe action with the lockout device may be assembled with any suitable lock-out actuating means. The bolt may be any suitable means, and for large scale production a bolt element with a rounded head might be used. Further, although shown specifically applied to the swivel pipe because of the several advantages associated with the swivel pipe and the fact that it is conventionally used in gas metered installations, the same concept can of course be applied to any other portion of the distribution or service connection.

The effectiveness of the installation of course will be directly related to the difficulty presented to the unauthorized user in attempting to remove or replace the pipe system.

Various modes of carrying out the invention are contemplated as being within the scope of the following claims, particularly pointing out and distinctly claiming the subject matter which is regarded as the invention.

I claim:

1. A fluid lockout apparatus for fluid system comprising a specially formed pipe section releasably secured into the flow system and including means to prevent ready removal of such pipe section, a lockout pipe section corresponding to said specially formed pipe section having sealing means sealing said pipe section, said sealing means is a separate expandable plug means adapted to be located within said lockout pipe section and having means for expanding of said plug means, said means for expanding of said plug means including an expanding actuator having an operator on at least one end of the plug means, said operator being specially constructed to receive a tool member for movement of the operator in a direction to expand said plug means, said operator including a coupling means to coact with said tool member and being arranged and constructed to prevent coupling of said tool member for opposite positioning of the operator and thereby essentially preventing collapse of the expanded plug means and non-destructive removal of said plug means, whereby said plug means can be introduced and sealed within said lockout pipe section on site and requires removal of the lockout section and destruction of the plug means for removal thereof.

2. The apparatus of claim 1 wherein said means for expanding said plug means includes a threaded connector, a turning member, said coupling means having an operation head at one end specially constructed to receive a tool member, and a cooperating locking head at the opposite end, said locking head being substantially spherical in configuration to prevent engagement by a turning tool member.

3. The apparatus of claim 1 wherein said lockout pipe section includes a swivel pipe including a center section connected to angled end sections, the first and second angled end sections being parallel straight sections, said first end section including a swivel coupling and adapted to be fixedly interconnected in a swivel connection to the flow system, said second end of said swivel pipe being a threaded member and adapted to thread into connecting member for interconnecting of the swivel pipe in the flow system.

4. The apparatus of claim 3 wherein angled end sections are parallel offset end sections.

5. The apparatus of claim 1 wherein said plug unit includes a compressible cylindrical rubber member, a steel washer abutting each end of said rubber plug and having a diameter essentially corresponding to the internal opening of the swivel pipe, a clamping bolt extending through said washers and said rubber plug and said coupling means including an operating head on the one end adjacent to the swivel coupling, a nut member integrally fixed to the inner washer, said bolt threading into said nut member, said bolt having a head being specially constructed to receive a screw driver, said head being adapted to receive a turning tool and permit turning of the bolt into the nut to compress the rubber plug between said steel washers and specially arranged and constructed to prevent opposite turning of the bolt by said tool, said head and said outermost washer at least being formed of a case heardened material to essentially minimize the probability of destruction thereof.

6. The apparatus of claim 1 wherein said sealing means includes an expandable lockout unit including a plug member formed of a rubber-like material, a first hardened washer abutting a first end of said plug, a second hardened washer abutting the second end of said plug, said second washer having a nut member fixedly attached thereto, an opening through said washers and said plug in precise alignment with said nut, an expanding bolt including said coupling means having a head member and extending through said openings with the head abutting said first washer and with the opposite threaded through said nut, said head having a slot for receiving of a screw driver and defining an operative slot for rotation of said bolt to thread into said washer for expanding said plug, said head portions removed and formed to define cam surfaces extending from the slot in the unthreading direction whereby introduction of a screw driver into said slot and turning in a direction to unthread the bolt from the nut results in the riding of the tool end upwardly on the cam surfaces and out of the head and thereby preventing release movement of the bolt, said nut having an outer substantially semi-spherical configuration to prevent turning engagement therewith.

7. A lockout apparatus for a fluid distribution system having a pipe line formed of interconnected pipes, comprising a swivel pipe section having first and second connecting ends with an intermediate angulated connecting portion whereby a tool member cannot be passed through the pipe member, one end of said swivel pipe member including a swivel connector adapted to be interconnected into a pipe line by complementing swivel connector elements, the second end of said pipe section having a connector for connection of the coupling to a second pipe of a distributing system, an expandable lockout unit including a plug member formed of a rubber-like material, a first hardened washer abutting a first end of said plug, a second hardened washer abutting the second end of said plug, said second washer having a nut member fixedly attached thereto, an opening through said washers and said plug in precise alignment with said nut, an expanding bolt having a head member and extending through said openings with the head abutting said first washer and with the opposite end threaded through said nut, said head having a slot for receiving of a screw driver and defining an operative slot for rotation of said bolt to thread into said washer for expanding said plug, said head portions removed and formed to define cam surfaces extending from the slot in the unthreading direction whereby introduction of a screw driver into said slot and turning in a direction to unthread the bolt from the nut results in the riding of the tool end upwardly on the cam surfaces and out of the head and thereby preventing release movement of the bolt, said washers and said bolt being formed of a case hardened steel having a hardness whereby a special hardened rotating tool is required for disruption and destruction of the bolt and/or washer to release the plug unit when expanded to the cut-off position and thereby essentially preventing on-site destruction of said bolt and/or washer to release the plug unit.

8. The lockout apparatus of claim 7 wherein said swivel unit is located downstream of a manually operable cut-off valve, said cutoff valve having means for releasably locking of a valve in a closed position.

* * * * *

UNITED STATES PATENT AND TRADEMARK OFFICE
CERTIFICATE OF CORRECTION

PATENT NO. : 4,503,880

DATED : March 12, 1985

INVENTOR(S) : Sherman W. Hochman

It is certified that error appears in the above-identified patent and that said Letters Patent is hereby corrected as shown below:

Claim 3, col. 6, line 44, After "to" insert ---first and second---; Claim 3, col. 6, line 48, After "end" insert ---section---; Claim 4, col. 6, line 52, After "wherein" insert ---said---; Claim 5, col. 7, line 2, Cancel "heardened" and substitute therefor ---hardened---

Signed and Sealed this

Twenty-ninth Day of October 1985

[SEAL]

Attest:

DONALD J. QUIGG

Attesting Officer

Commissioner of Patents and
Trademarks—Designate